United States Patent
Ohno

(10) Patent No.: US 12,026,994 B2
(45) Date of Patent: Jul. 2, 2024

(54) OIL DIAGNOSTIC DEVICE, OIL DIAGNOSTIC METHOD, AND STORAGE MEDIUM

(71) Applicant: TOYOTA JIDOSHA KABUSHIKI KAISHA, Toyota (JP)

(72) Inventor: Makoto Ohno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 17/939,423

(22) Filed: Sep. 7, 2022

(65) Prior Publication Data
US 2023/0088238 A1 Mar. 23, 2023

(30) Foreign Application Priority Data
Sep. 21, 2021 (JP) .................. 2021-153576

(51) Int. Cl.
*G07C 5/08* (2006.01)
*G06F 16/2458* (2019.01)
*G06F 16/903* (2019.01)
*G07C 5/00* (2006.01)

(52) U.S. Cl.
CPC ....... *G07C 5/0808* (2013.01); *G06F 16/2462* (2019.01); *G06F 16/90335* (2019.01); *G07C 5/008* (2013.01)

(58) Field of Classification Search
CPC .... G07C 5/0808; G07C 5/008; G07C 5/0841; G06F 16/2462; G06F 16/90335
See application file for complete search history.

(56) References Cited

U.S. PATENT DOCUMENTS

| 6,253,601 B1 * | 7/2001 | Wang ..................... F01M 11/10 701/29.5 |
| 2014/0331746 A1 * | 11/2014 | Ito ...................... G01N 33/2888 73/53.06 |

FOREIGN PATENT DOCUMENTS

JP 2019-014437 A 1/2019

* cited by examiner

*Primary Examiner* — Xiao En Mo
(74) *Attorney, Agent, or Firm* — Dinsmore & Shohl LLP

(57) ABSTRACT

An oil diagnostic device includes a generator configured to generate a statistical causal search model showing a correlation between a plurality of kinds of driving information by using first data that is the individual kinds of driving information acquired in advance from sensors connected to an on-board unit mounted on a vehicle, an acquirer configured to acquire second data that is driving information acquired from a sensor mounted on the vehicle and provided independently of the on-board unit, an estimator configured to estimate the driving information corresponding to the second data by using the statistical causal search model, and a deriver configured to derive a precursor accumulation amount of the vehicle from the estimated driving information.

5 Claims, 10 Drawing Sheets

OIL DIAGNOSTIC DEVICE, OIL DIAGNOSTIC METHOD, AND STORAGE MEDIUM

CROSS-REFERENCE TO RELATED APPLICATION

This application claims priority to Japanese Patent Application No. 2021-153576 filed on Sep. 21, 2021, incorporated herein by reference in its entirety.

BACKGROUND

1. Technical Field

The present disclosure relates to an oil diagnostic device, an oil diagnostic method, and a storage medium for diagnosing driving.

2. Description of Related Art

Japanese Unexamined Patent Application Publication No. 2019-14437 (JP 2019-14437 A) discloses a diagnostic system that acquires driving information related to a vehicle driving operation from an on-board unit and diagnoses a driving skill by using the driving information.

SUMMARY

Genuine on-board units are expensive, and therefore an inexpensive recording device (logger) may be mounted to record the driving information of the vehicle. However, the driving information that can be acquired by the inexpensive recording device is limited. Therefore, the diagnostic system compatible with the on-board unit cannot always make a diagnosis by using the driving information acquired from the inexpensive recording device.

An object of the present disclosure is to provide an oil diagnostic device, an oil diagnostic method, and a storage medium in which a diagnostic system compatible with an on-board unit can make a diagnosis by using driving information acquired from an inexpensive recording device.

An oil diagnostic device according to a first aspect includes a generator configured to generate a statistical causal search model showing a correlation between a plurality of kinds of driving information by using first data that is the individual kinds of driving information acquired in advance from sensors connected to an on-board unit mounted on a vehicle, an acquirer configured to acquire second data that is driving information acquired from a sensor mounted on the vehicle and provided independently of the on-board unit, an estimator configured to estimate the driving information corresponding to the second data by using the statistical causal search model, and a deriver configured to derive a precursor accumulation amount of the vehicle from the estimated driving information.

The oil diagnostic device according to the first aspect diagnoses oil by using the second data that is the driving information acquired from the sensor mounted on the vehicle and provided independently of the on-board unit. When diagnosing the oil, the oil diagnostic device generates the statistical causal search model showing the correlation between the plurality of kinds of driving information by using the first data that is the driving information acquired in advance from the sensors mounted on the on-board unit, estimates the driving information corresponding to the second data by using the statistical causal search model, and derives the precursor accumulation amount. That is, the oil diagnostic device diagnoses the oil based on the driving information acquired from the sensor retrofitted to the vehicle by utilizing the driving information acquired in advance from the sensors connected to the on-board unit. Thus, the diagnostic system compatible with the on-board unit can make a diagnosis by using the measurement information acquired from the inexpensive measurement device.

In the oil diagnostic device according to the first aspect, the deriver may be configured to derive the precursor accumulation amount by using a trained model subjected to machine learning of a relationship between the driving information and the precursor accumulation amount by using the first data.

According to the oil diagnostic device of the first aspect, the oil can be diagnosed by utilizing the first data acquired from the on-board unit.

In the oil diagnostic device according to the first aspect, the estimator may be configured to estimate driving information including at least one of an average value of a fuel consumption, an integrated value of an engine speed, and a maximum value of the engine speed.

According to the oil diagnostic device of the first aspect, the precursor accumulation amount can be derived by clarifying the relationship.

An oil diagnostic method according to a second aspect includes generating a statistical causal search model showing a correlation between a plurality of kinds of driving information by using first data that is the individual kinds of driving information acquired in advance from sensors connected to an on-board unit mounted on a vehicle, acquiring second data that is driving information acquired from a sensor mounted on the vehicle and provided independently of the on-board unit, estimating the driving information corresponding to the second data by using the statistical causal search model, and deriving a precursor accumulation amount of the vehicle from the estimated driving information.

In the oil diagnostic method according to the second aspect, oil is diagnosed by using the second data that is the driving information acquired from the sensor mounted on the vehicle and provided independently of the on-board unit. When diagnosing the oil in the oil diagnostic method, the statistical causal search model showing the correlation between the plurality of kinds of driving information is generated by using the first data that is the driving information acquired in advance from the sensors mounted on the on-board unit, the driving information corresponding to the second data is estimated by using the statistical causal search model, and the precursor accumulation amount is derived. That is, according to the oil diagnostic method, the oil is diagnosed based on the driving information acquired from the sensor retrofitted to the vehicle by utilizing the driving information acquired in advance from the sensors connected to the on-board unit. Thus, the diagnostic system compatible with the on-board unit can make a diagnosis by using the measurement information acquired from the inexpensive measurement device.

A storage medium according to a third aspect stores an oil diagnostic program that causes a computer to execute processes including generating a statistical causal search model showing a correlation between a plurality of kinds of driving information by using first data that is the individual kinds of driving information acquired in advance from sensors connected to an on-board unit mounted on a vehicle, acquiring second data that is driving information acquired from a sensor mounted on the vehicle and provided independently of the on-board unit, estimating the driving information corresponding to the second data by using the statistical causal search model, and deriving a precursor accumulation amount of the vehicle from the estimated driving information.

The computer that executes the oil diagnostic program according to the third aspect diagnoses oil by using the second data that is the driving information acquired from the sensor mounted on the vehicle and provided independently of the on-board unit. When diagnosing the oil, the computer generates the statistical causal search model showing the correlation between the plurality of kinds of driving information by using the first data that is the driving information acquired in advance from the sensors mounted on the on-board unit, estimates the driving information corresponding to the second data by using the statistical causal search model, and derives the precursor accumulation amount. That is, the computer diagnoses the oil based on the driving information acquired from the sensor retrofitted to the vehicle by utilizing the driving information acquired in advance from the sensors connected to the on-board unit. Thus, the diagnostic system compatible with the on-board unit can make a diagnosis by using the measurement information acquired from the inexpensive measurement device.

According to the present disclosure, the diagnostic system compatible with the on-board unit can make a diagnosis by using the driving information acquired from the inexpensive recording device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An oil diagnostic system including an oil diagnostic device of the present disclosure will be described. The oil diagnostic system diagnoses an accumulation amount of a precursor (accumulated substance) accumulated in an engine by using data related to a driving operation that is acquired from a sensor of a measurement device mounted on a vehicle but not connected to the vehicle. In the present disclosure, when the diagnosis is made by using the data related to the driving operation that is acquired from the sensor of the measurement device, data related to the driving operation that is acquired from a sensor connected to an on-board unit of the vehicle is utilized.

Overall Configuration

Figure 1:
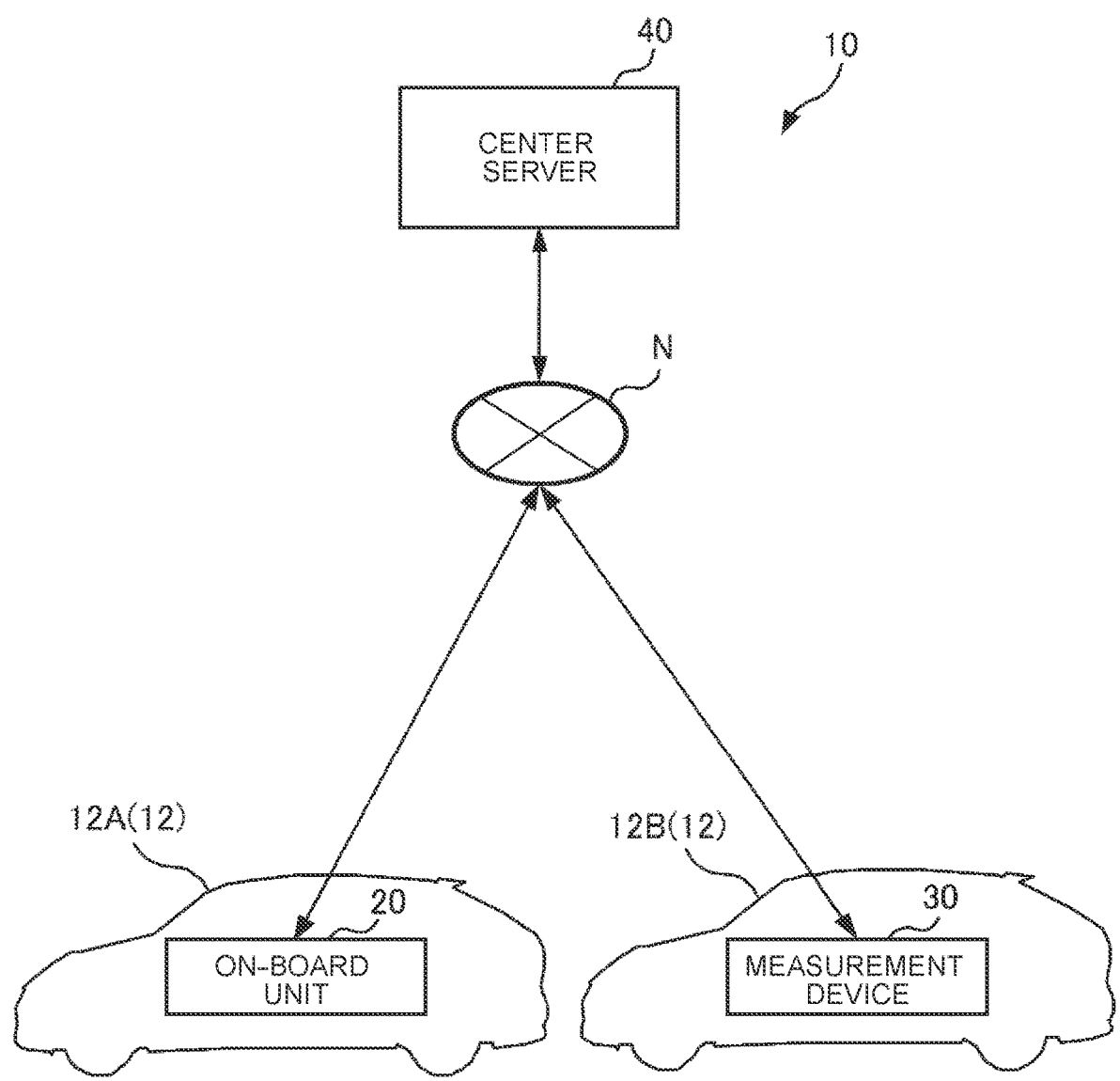
FIG. 1 is a diagram showing a schematic configuration of an oil diagnostic system according to an embodiment.

As shown in FIG. 1, an oil diagnostic system 10 according to an embodiment of the present disclosure includes a plurality of vehicles 12 and a center server 40 serving as an oil diagnostic device. The vehicles 12 include a vehicle 12A including an on-board unit 20, and a vehicle 12B including a measurement device 30. The on-board unit 20 and the measurement device 30 are connected to the center server 40 via a network N.

Although FIG. 1 shows two vehicles 12 including the on-board unit 20 or the measurement device 30 for one center server 40, the numbers of vehicles 12, on-board units 20, and measurement devices 30 are not limited to those numbers.

The on-board unit 20 acquires driving information related to an operation on the vehicle 12, and transmits the driving information to the center server 40.

The measurement device 30 acquires measured driving information, and transmits the driving information to the center server 40. The types of sensors connected to the measurement device 30 are limited as compared with the on-board unit 20 mounted on the vehicle 12A. The sensors connected to the measurement device 30 are lower than the sensors connected to the on-board unit 20 in terms of the accuracy of acquired data. Therefore, the measurement device 30 is traded at a lower price than the on-board unit 20, and is mounted on the vehicle 12B.

The center server 40 is installed in, for example, a manufacturer of the vehicles 12 or a car dealer affiliated with the manufacturer.

The driving information acquired from the on-board unit 20 is hereinafter referred to as "driving information", and the driving information acquired from the measurement device 30 is hereinafter referred to as "measurement information". For example, in the present embodiment, the driving information includes a vehicle speed, an acceleration, a yaw rate, a steering angle, an accelerator operation amount, a brake pedal depression force, a stroke engine rotation speed, a fuel consumption, and a traveling distance, and the measurement information includes positioning information and an acceleration. The driving information is an example of "first data", and the measurement information is an example of "second data".

Vehicle

Figure 2:
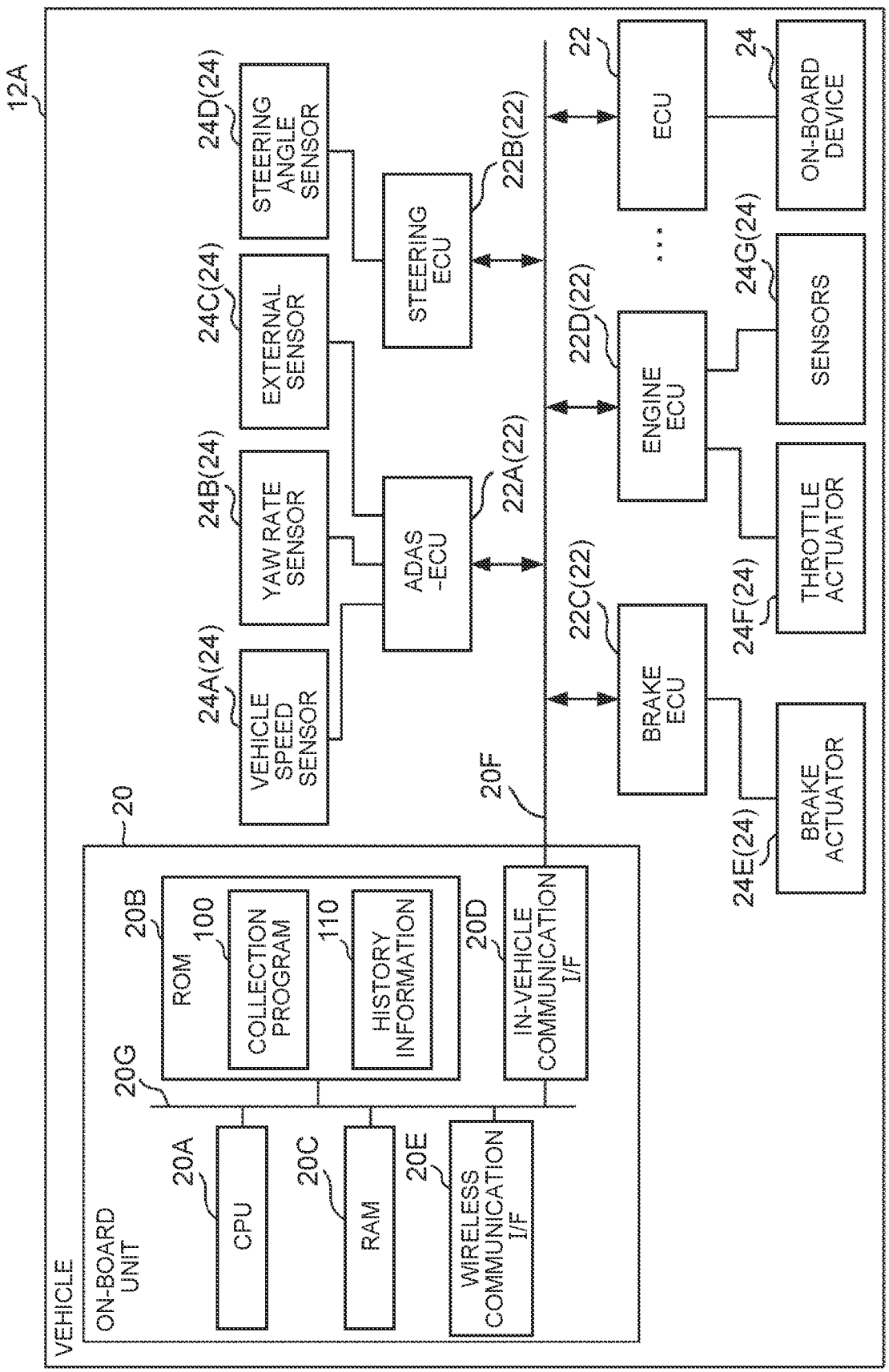
FIG. 2 is a block diagram showing a hardware configuration of a vehicle according to the embodiment.

As shown in FIG. 2, the vehicle 12A according to the present embodiment includes the on-board unit 20, a plurality of electronic control units (ECUs) 22, and a plurality of on-board devices 24.

The on-board unit 20 includes a central processing unit (CPU) 20A, a read-only memory (ROM) 20B, a random access memory (RAM) 20C, an in-vehicle communication interface (I/F) 20D, and a wireless communication I/F 20E. The CPU 20A, the ROM 20B, the RAM 20C, the in-vehicle communication I/F 20D, and the wireless communication I/F 20E are connected so as to be able to communicate with each other via an internal bus 20G.

The CPU 20A is a central processing unit that executes various programs and controls various units. That is, the CPU 20A reads the program from the ROM 20B and executes the program using the RAM 20C as a work area.

The ROM 20B stores various programs and various data. The ROM 20B of the present embodiment stores a collection program 100 that collects driving information related to conditions and control on the vehicle 12A from the ECUs 22. Along with execution of the collection program 100, the on-board unit 20 executes a process of transmitting the driving information to the center server 40. The ROM 20B also stores history information 110 that is backup data of the driving information. The RAM 20C temporarily stores a program or data as a work area.

The in-vehicle communication I/F 20D is an interface for connecting to each of the ECUs 22. For the interface, a communication standard based on a controller area network (CAN) protocol is used. The in-vehicle communication I/F 20D is connected to an external bus 20F.

The wireless communication I/F 20E is a wireless communication module for communicating with the center server 40. For the wireless communication module, for example, communication standards such as fifth generation (5G), long term evolution (LTE), and Wi-Fi (registered trademark) are used. The wireless communication I/F 20E is connected to the network N.

The ECUs 22 include at least an advanced driver assistance system (ADAS)-ECU 22A, a steering ECU 22B, a brake ECU 22C, and an engine ECU 22D.

The ADAS-ECU 22A controls an advanced driver assistance system in an integrated manner. A vehicle speed sensor 24A, a yaw rate sensor 24B, and an external sensor 24C that constitute the on-board devices 24 are connected to the ADAS-ECU 22A. The external sensor 24C is a group of sensors used for detecting the surrounding environment of the vehicle 12A. The external sensor 24C includes, for example, a camera that captures images of surrounding areas of the vehicle 12A, a millimeter-wave radar that transmits an exploration wave and receives a reflective wave, and a laser imaging, detection, and ranging (LiDAR) sensor that scans an area ahead of the vehicle 12A.

The steering ECU 22B controls power steering. A steering angle sensor 24D constituting the on-board devices 24 is connected to the steering ECU 22B. The steering angle sensor 24D detects a steering angle of a steering wheel.

The brake ECU 22C controls a brake system of the vehicle 12A. A brake actuator 24E constituting the on-board devices 24 is connected to the brake ECU 22C.

The engine ECU 22D controls an engine of the vehicle 12A. A throttle actuator 24F and sensors 24G constituting the on-board devices 24 are connected to the engine ECU 22D. The sensors 24G include an oil temperature sensor for measuring an oil temperature of engine oil, an oil pressure sensor for measuring an oil pressure of the engine oil, and a rotation sensor for detecting a rotation speed of the engine.

The vehicle speed sensor 24A, the yaw rate sensor 24B, the external sensor 24C, the steering angle sensor 24D, the brake actuator 24E, the throttle actuator 24F, and the sensors 24G according to the present embodiment are examples of "sensors connected to an on-board unit".

Figure 3:
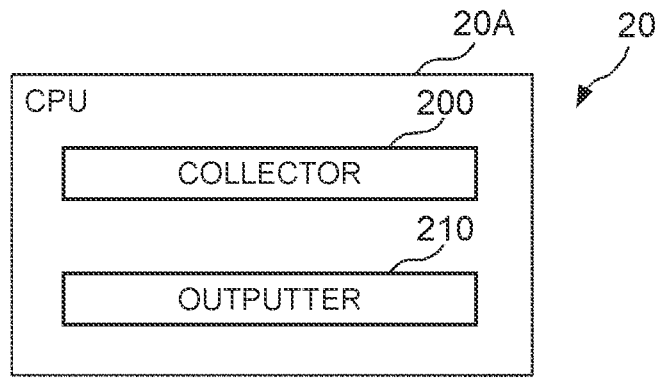
FIG. 3 is a block diagram showing a functional configuration of an on-board unit according to the embodiment.

As shown in FIG. 3, in the on-board unit 20 according to the present embodiment, the CPU 20A functions as a collector 200 and an outputter 210 by executing the collection program 100.

The collector 200 has a function of acquiring, from the ECUs 22 of the vehicle 12A, driving information related to conditions of the on-board devices 24 and driving of the vehicle 12A obtained from the on-board devices 24. The driving information may include an image of an area outside the vehicle 12A captured by the camera serving as the external sensor 24C.

The outputter 210 has a function of outputting the driving information collected by the collector 200 to the center server 40.

Measurement Device

Figure 4:
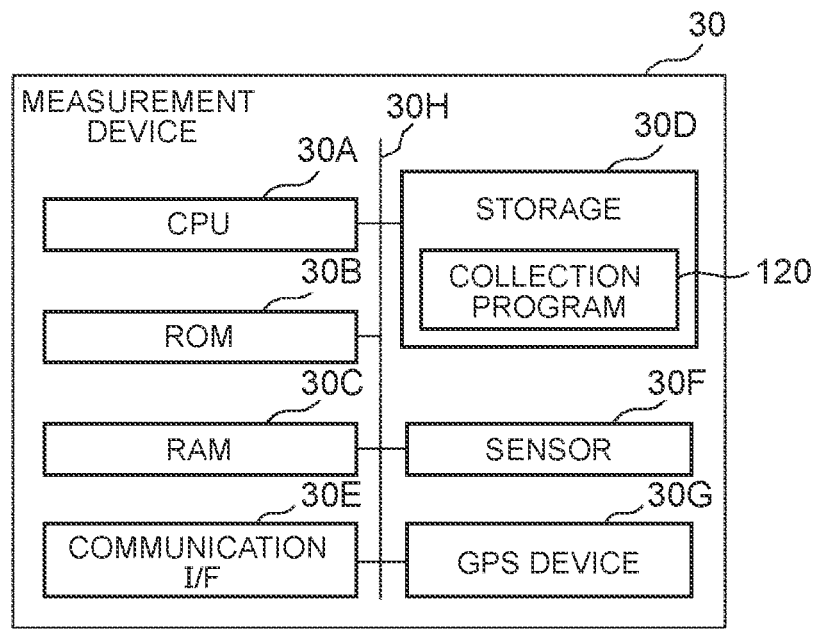
FIG. 4 is a block diagram showing a hardware configuration of a measurement device according to the embodiment.

As shown in FIG. 4, the measurement device 30 includes a CPU 30A, a ROM 30B, a RAM 30C, a storage 30D, a communication I/F 30E, a sensor 30F, and a global positioning system (GPS) device 30G. The CPU 30A, the ROM 30B, the RAM 30C, the storage 30D, the communication I/F 30E, the sensor 30F, and the GPS device 30G are connected so as to be able to communicate with each other via an internal bus 30H. The functions of the CPU 30A, the ROM 30B, the RAM 30C, and the communication I/F 30E are the same as those of the CPU 20A, the ROM 20B, the RAM 20C, and the wireless communication I/F 20E of the on-board unit 20 described above.

The storage 30D serving as a memory is a hard disk drive (HDD) or a solid state drive (SSD), and stores various programs and measurement information related to driving of the vehicle 12 acquired from the sensor 30F and the GPS device 30G. The storage 30D of the present embodiment stores a collection program 120. The ROM 30B may store the collection program 120.

The sensor 30F includes an acceleration sensor that detects an acceleration on the measurement device 30 mounted on the vehicle, and an angular velocity sensor that detects an angular velocity in a yaw direction.

The GPS device 30G detects a position by receiving, from a plurality of GPS satellites, positioning information obtained by measuring the position of the measurement device 30 mounted on the vehicle 12B. The GPS device 30G includes an antenna (not shown) that receives the positioning information from the GPS satellites.

The collection program 120 serving as a program performs a process of acquiring positioning information, an acceleration, and an angular velocity as measurement information and transmitting the measurement information to the center server 40.

The sensor 30F and the GPS device 30G according to the present embodiment are examples of "sensors mounted on a vehicle and provided independently of an on-board unit". The phrase "provided independently" means that the sensors are mounted on the vehicle 12 and connected to the measurement device 30 different from the on-board unit 20.

Figure 5:
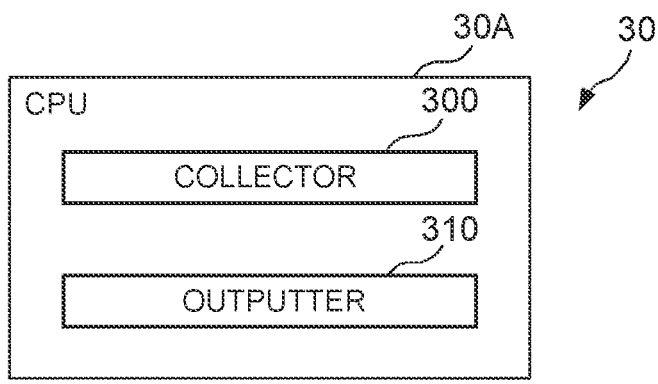
FIG. 5 is a block diagram showing a functional configuration of the measurement device according to the embodiment.

As shown in FIG. 5, in the measurement device 30 according to the present embodiment, the CPU 30A functions as a collector 300 and an outputter 310 by executing the collection program 120.

The collector 300 collects, as measurement information, positioning information of the measurement device 30 mounted on the vehicle 12B from the GPS device 30G and an acceleration and an angular velocity of the vehicle 12B from the sensor 30F.

The outputter 310 has a function of outputting the measurement information collected by the collector 300 to the center server 40.

Center Server

Figure 6:
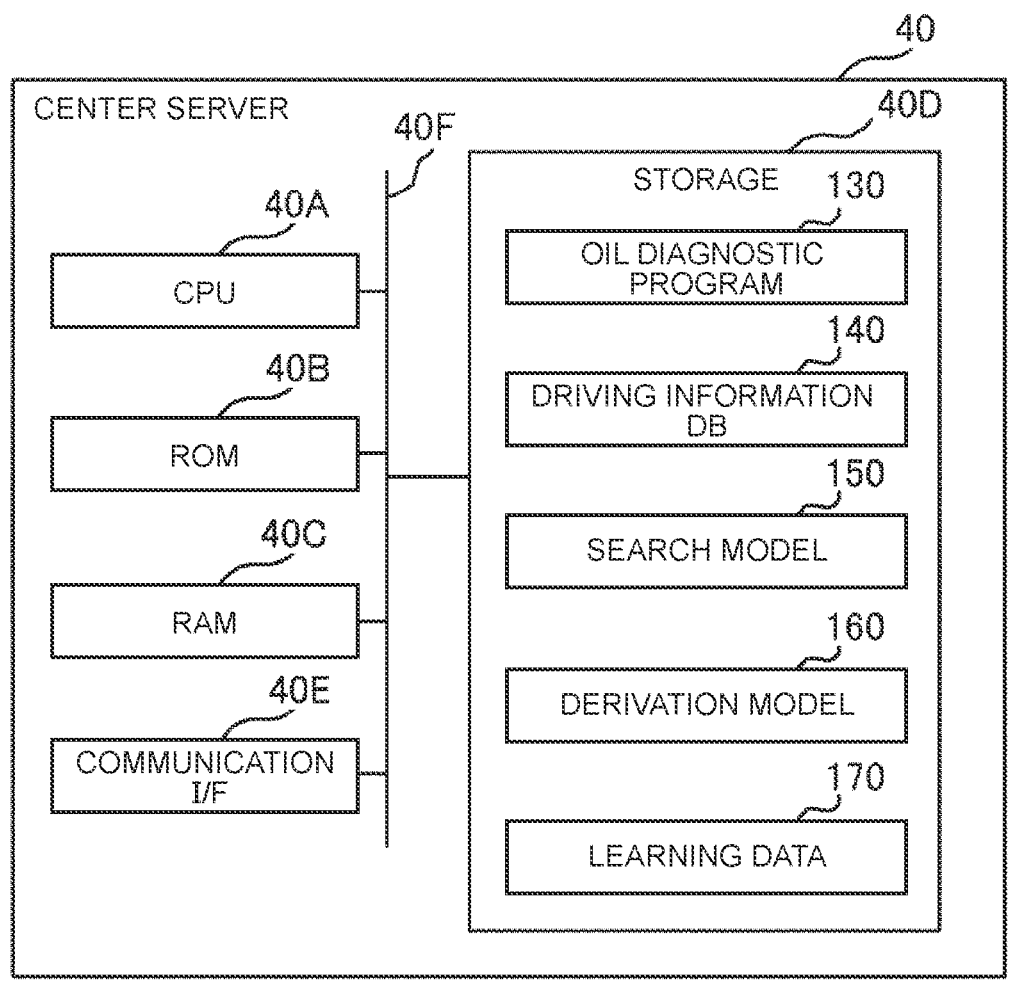
FIG. 6 is a block diagram showing a hardware configuration of a center server according to the embodiment.

As shown in FIG. 6, the center server 40 includes a CPU 40A, a ROM 40B, a RAM 40C, a storage 40D, and a communication I/F 40E. The CPU 40A, the ROM 40B, the RAM 40C, the storage 40D, and the communication I/F 40E are connected so as to be able to communicate with each other via an internal bus 40F. The functions of the CPU 40A, the ROM 40B, the RAM 40C, and the communication I/F 40E are the same as those of the CPU 20A, the ROM 20B, the RAM 20C, and the wireless communication I/F 20E of the on-board unit 20 described above. The communication I/F 40E may perform wired communication.

The storage 40D serving as a memory is a hard disk drive (HDD) or a solid state drive (SSD), and stores various programs and various data. The storage 40D of the present embodiment stores an oil diagnostic program 130, a driving information database (DB) 140, a search model 150, a derivation model 160, and learning data 170. The ROM 40B may store the oil diagnostic program 130, the driving information database (DB) 140, the search model 150, the derivation model 160, and the learning data 170.

The oil diagnostic program 130 serving as a program controls the center server 40. Along with execution of the oil diagnostic program 130, the center server 40 executes processes including an oil diagnostic process for diagnosing an accumulation amount of a precursor of the vehicle 12.

The driving information DB 140 stores driving information received from the on-board unit 20 and measurement information received from the measurement device 30.

The search model 150 shows a correlation between pieces of data related to the driving of the vehicle that are generated by using the driving information acquired from the on-board unit 20. Specifically, the search model 150 is a model in which the correlation between pieces of data is estimated in association from the pieces of data included in the driving information by using a statistical causal search (LiNGAM: Linear Non-Gaussian Acyclic Model) for the correlation between the pieces of data.

Figure 7:
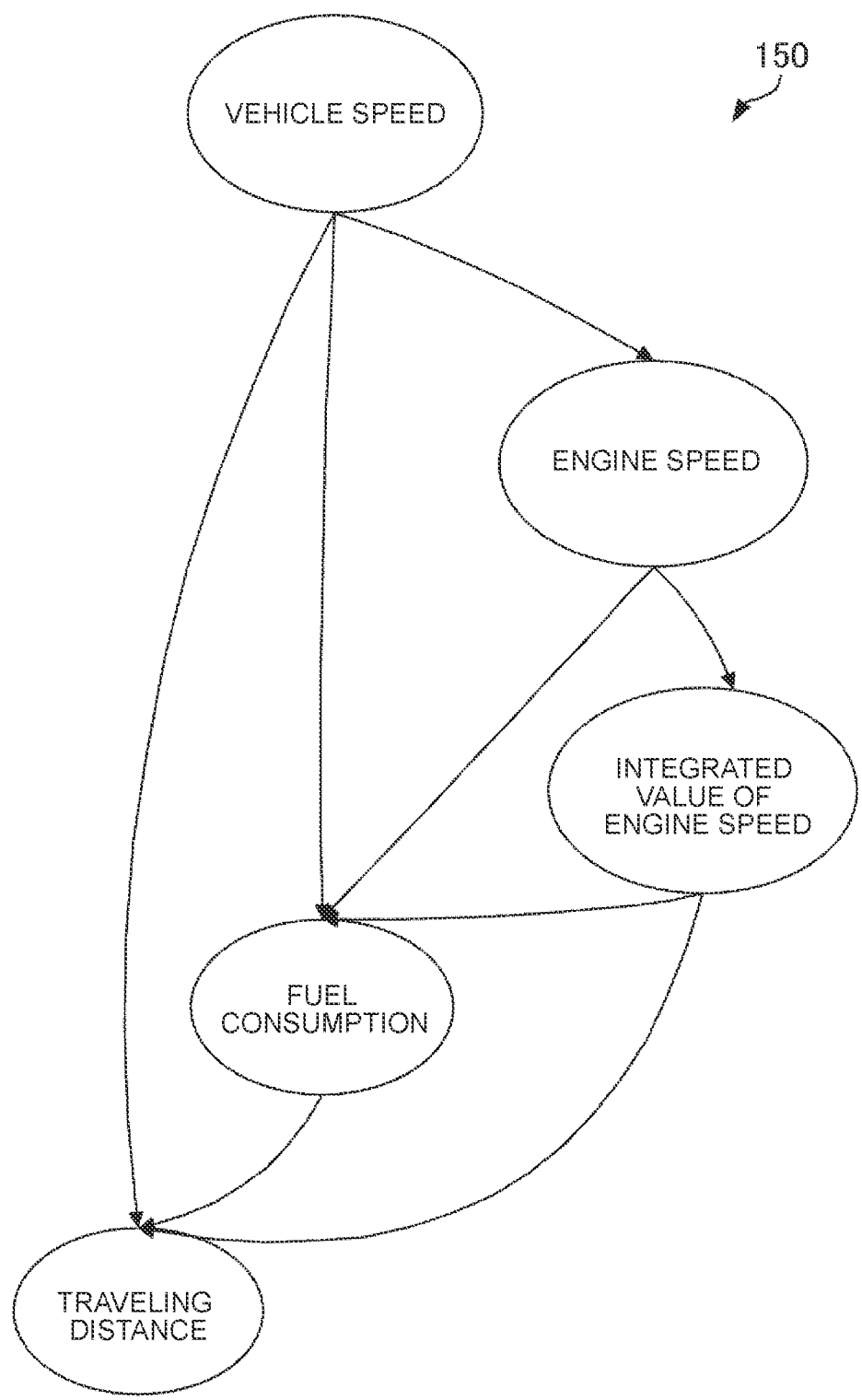
FIG. 7 is a schematic diagram showing an example of a statistical causal search model according to the embodiment.

As shown in, for example, FIG. 7, the search model 150 shows a correlation among pieces of data on a vehicle speed, an engine speed, an integrated value of the engine speed, a fuel consumption, and a traveling distance included in the driving information, and each piece of data can be estimated from the correlation among the pieces of data. For example, according to the search model 150, the engine speed, the fuel consumption, and the traveling distance can be estimated from the vehicle speed, and the integrated value of the engine speed and the fuel consumption can be estimated from the engine speed. According to the search model 150, the fuel consumption and the traveling distance can be estimated from the integrated value of the engine speed, and the traveling distance can be estimated from the fuel consumption.

That is, the engine speed, the integrated value of the engine speed, the fuel consumption, and the traveling distance can be estimated by inputting the vehicle speed into the search model 150.

The derivation model 160 is a trained model subjected to machine learning of a relationship between the driving information and the precursor accumulation amount in the learning data 170 described later to derive the accumulation amount of the precursor of the engine. The derivation model 160 according to the present embodiment outputs a corresponding precursor accumulation amount by inputting a maximum value of the engine speed, an integrated value of the engine speed, and a fuel consumption.

The learning data 170 is data for training the derivation model 160. The learning data 170 is data in which prestored driving information including a maximum value of the engine speed, an integrated value of the engine speed, and a fuel consumption is input data and a precursor accumulation amount corresponding to the driving information is teaching data.

Figure 8:
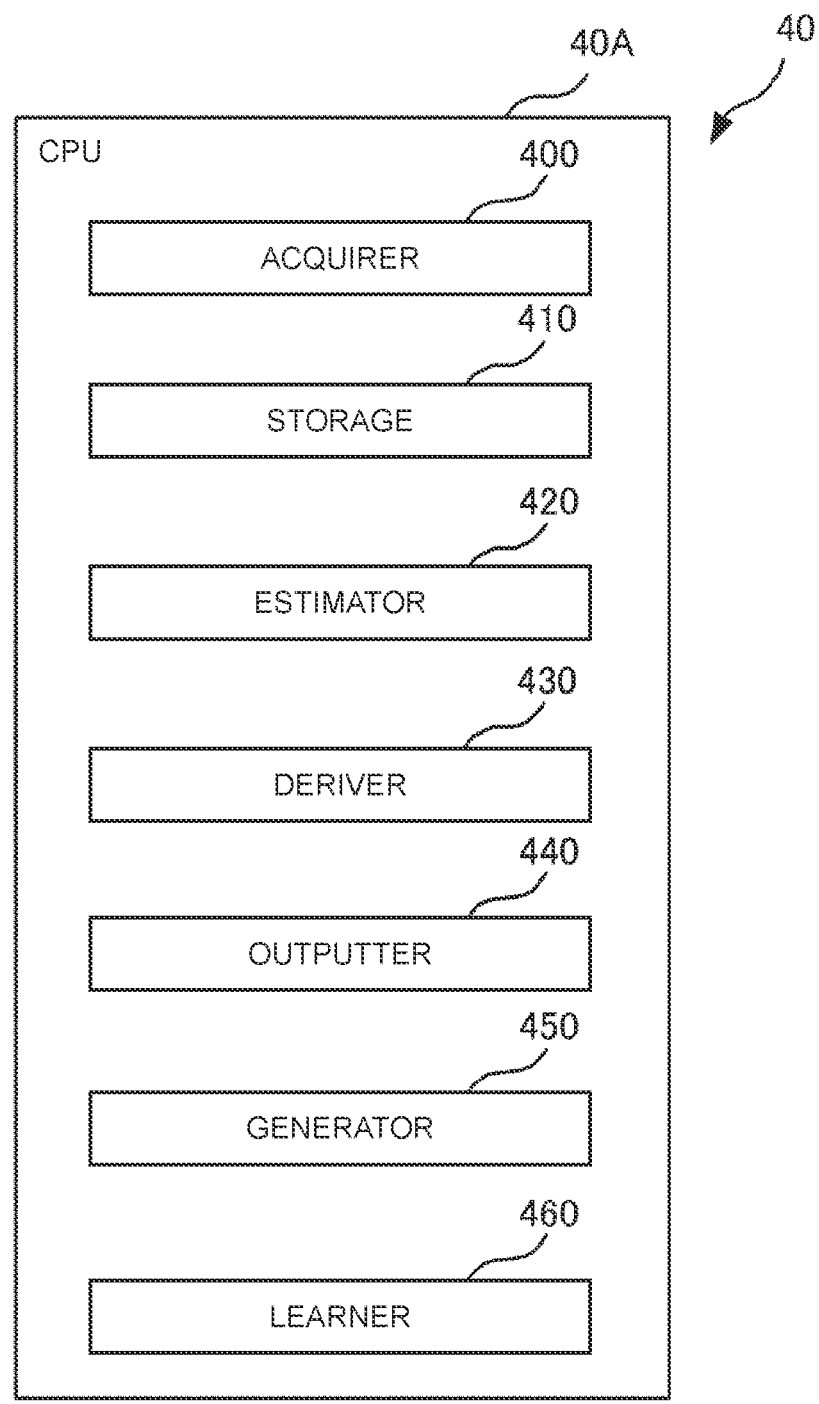
FIG. 8 is a block diagram showing a functional configuration of the center server according to the embodiment.

As shown in FIG. 8, in the center server 40 of the present embodiment, the CPU 40A functions as an acquirer 400, a storage 410, an estimator 420, a deriver 430, an outputter 440, a generator 450, and a learner 460 by executing the oil diagnostic program 130.

The acquirer 400 has a function of acquiring driving information and measurement information from the on-board unit 20 of the vehicle 12A and the measurement device 30 of the vehicle 12B. The acquirer 400 acquires the driving information and the measurement information transmitted from the on-board unit 20 and the measurement device 30 at arbitrary timings.

The storage 410 stores the search model 150 and the derivation model 160 generated by using the driving information acquired from the on-board unit 20.

The estimator 420 estimates driving information of the vehicle 12 corresponding to data related to measurement information by using the search model 150. Specifically, the estimator 420 estimates a vehicle speed of the vehicle 12 from positioning information, an acceleration, and an angular velocity included in the measurement information, and estimates driving information corresponding to the vehicle speed by using the search model 150. For example, the estimator 420 estimates an engine speed, an integrated value of the engine speed, and a fuel consumption as the driving information.

The deriver 430 derives a precursor accumulation amount from the estimated driving information by using the derivation model 160. For example, the deriver 430 according to the present embodiment derives the precursor accumulation amount from a maximum value of the estimated engine speed, the integrated value of the engine speed, and an average value of the fuel consumption by using the derivation model 160.

The outputter 440 outputs a derivation result from the deriver 430. To output the derivation result, the outputter 440 may transmit the derivation result to the on-board unit 20, the measurement device 30, and the like, or display the derivation result on a monitor (not shown) provided in the center server 40.

The generator 450 generates a search model by using the driving information acquired in advance from the on-board unit 20 and stored in the driving information DB 140. For example, the generator 450 estimates a correlation between pieces of data such as an engine speed, an integrated value of the engine speed, and a fuel consumption related to the driving information by analyzing the pieces of data, and generates a search model capable of estimating a value of one piece of data corresponding to another piece of data.

The learner 460 generates, by using the driving information acquired in advance from the on-board unit 20 and stored in the driving information DB 140, a derivation model that is a trained model subjected to machine learning for deriving a precursor accumulation amount. Specifically, the learner 460 generates the derivation model by executing supervised learning in which the driving information acquired from the vehicle 12 is input data and a precursor accumulation amount corresponding to the driving information is teaching data.

Figure 9:
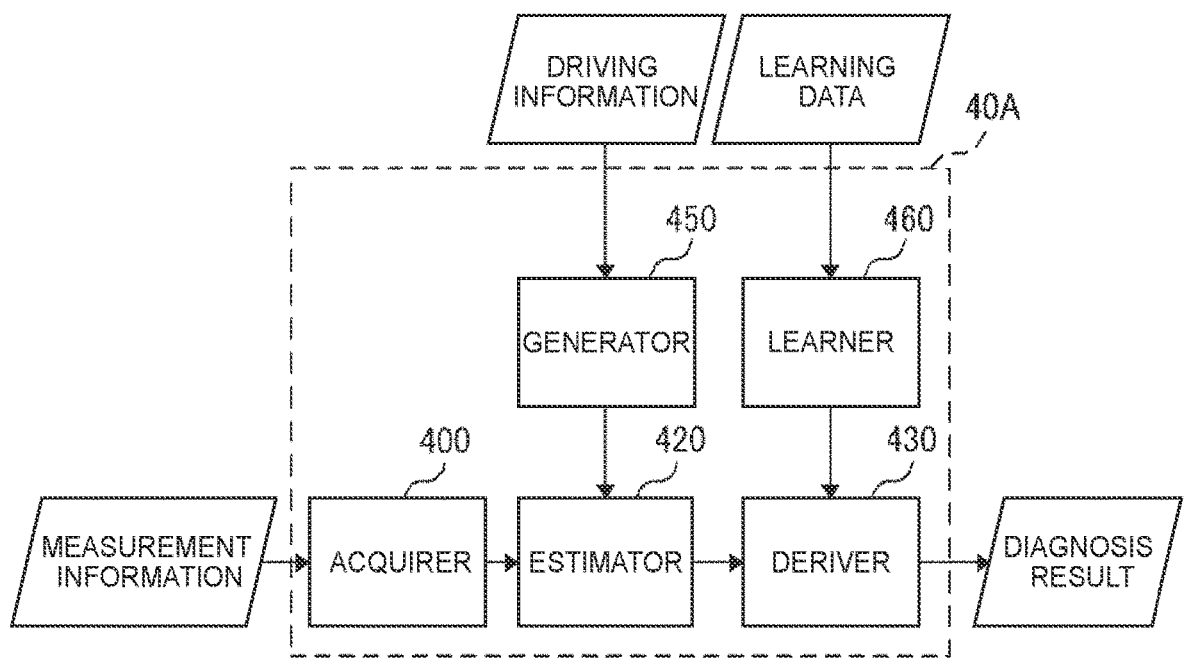
FIG. 9 is a data flow diagram showing an example of a data flow of processes to be executed in the center server according to the embodiment.

Prior to description of operation of the oil diagnostic system 10, a data flow in the center server 40 serving as the oil diagnostic device will be described with reference to FIG. 9. FIG. 9 is a data flow diagram showing an example of the data flow in the center server 40.

For example, as shown in FIG. 9, the generator 450 generates the search model 150 by using driving information stored in the driving information DB 140, and outputs the search model 150 to the estimator 420.

The learner 460 generates the derivation model subjected to learning of the precursor accumulation amount corresponding to the driving information by using the learning data 170 including the driving information and the precursor accumulation amount, and outputs the derivation model to the deriver 430.

The acquirer 400 acquires measurement information from the measurement device 30, and inputs the acquired measurement information to the estimator 420. The estimator 420 estimates a maximum value of an engine speed, an integrated value of the engine speed, and an average value of a fuel consumption as driving information corresponding to data related to the measurement information by using the search model 150, and inputs the estimated driving information to the deriver 430. The deriver 430 derives a precursor accumulation amount from the estimated driving information by using the derivation model 160 generated by the learner 460, and outputs the precursor accumulation amount as a diagnosis result.

Flow of Control

Figure 10:
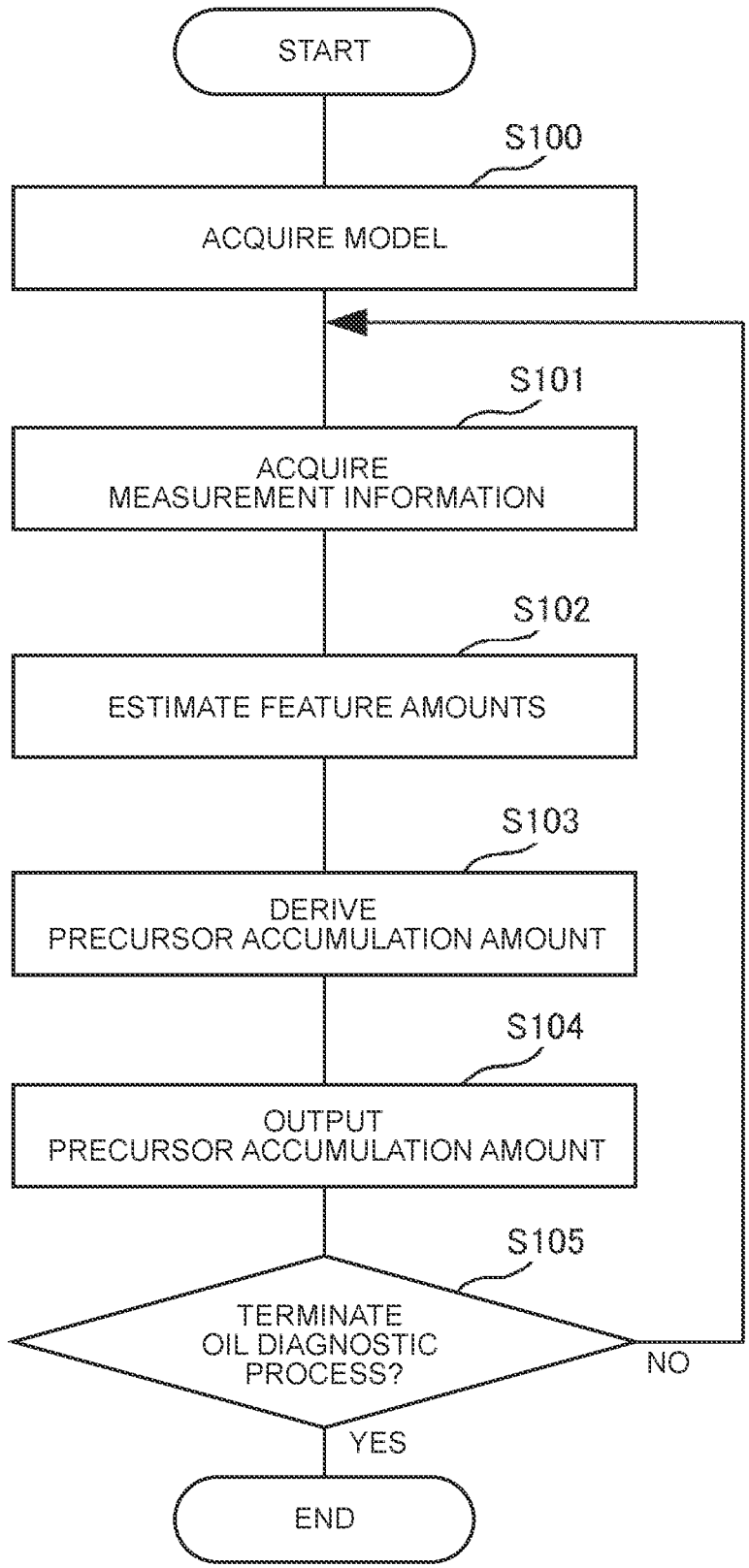
FIG. 10 is a flowchart showing a flow of an oil diagnostic process to be executed in the center server according to the embodiment.

A flow of a process to be executed by the oil diagnostic system 10 of the present embodiment will be described with reference to a flowchart of FIG. 10. Each process in the center server 40 is executed by the CPU 40A of the center server 40 functioning as the acquirer 400, the storage 410, the estimator 420, the deriver 430, the outputter 440, the generator 450, and the learner 460. An oil diagnostic process shown in FIG. 10 is executed, for example, when an instruction to execute oil diagnosis is input.

In Step S100, the CPU 40A acquires the stored search model 150 and the stored derivation model 160.

In Step S101, the CPU 40A acquires measurement information from the measurement device 30.

In Step S102, the CPU 40A estimates a maximum value of an engine speed, an integrated value of the engine speed, and an average value of a fuel consumption as driving information from the measurement information by using the search model 150.

In Step S103, the CPU 40A derives a precursor accumulation amount from the estimated maximum value of the engine speed, the estimated integrated value of the engine speed, and the estimated average value of the fuel consumption by using the derivation model 160.

In Step S104, the CPU 40A outputs the derived precursor accumulation amount.

In Step S105, the CPU 40A determines whether to terminate the oil diagnostic process. When determination is made to terminate the oil diagnostic process (Step S105: YES), the oil diagnostic process is terminated. When determination is made not to terminate the oil diagnostic process (Step S105: NO), the CPU 40A proceeds to Step S101 to acquire measurement information.

Figure 11:
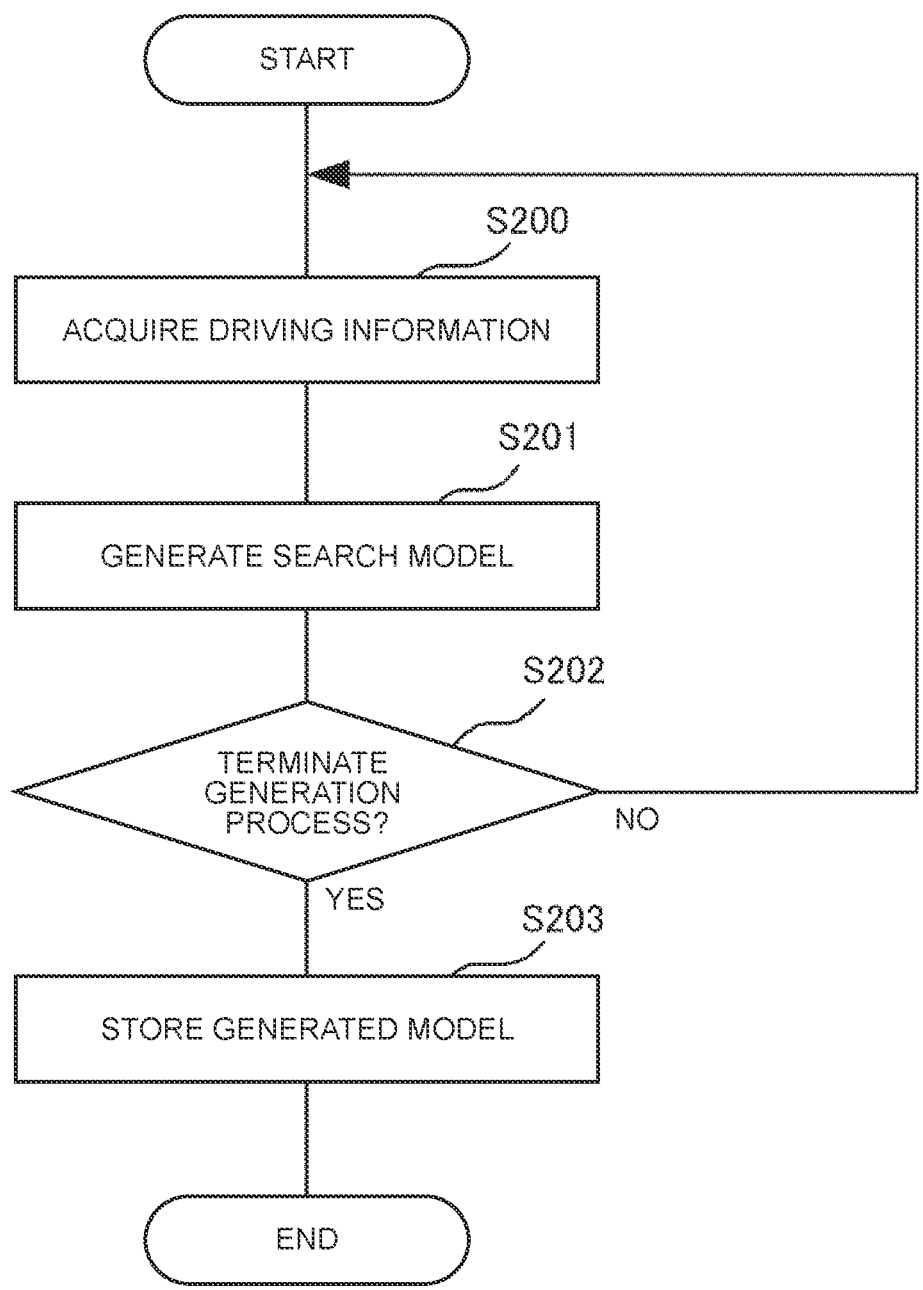
FIG. 11 is a flowchart showing a flow of a generation process to be executed in the center server according to the embodiment.

Next, a process to be executed by the oil diagnostic system 10 of the present embodiment to generate the search model 150 by using the driving information acquired in advance from the on-board unit 20 will be described with reference to a flowchart of FIG. 11. The generation process shown in FIG. 11 is executed, for example, when an instruction to execute the process for generating the search model 150 is input.

In Step S200, the CPU 40A acquires driving information stored by being acquired in advance from the on-board unit 20.

In Step S201, the CPU 40A generates the search model 150 by using the acquired driving information.

In Step S202, the CPU 40A determines whether to terminate the process for generating the search model 150. When determination is made to terminate the process for generating the search model 150 (Step S202: YES), the process proceeds to Step S203. When determination is made not to terminate the process for generating the search model 150 (Step S202: NO), the CPU 40A proceeds to Step S200 to acquire driving information.

In Step S203, the CPU 40A stores the generated search model 150 in the storage 40D, and terminates the process for generating the search model 150.

Figure 12:
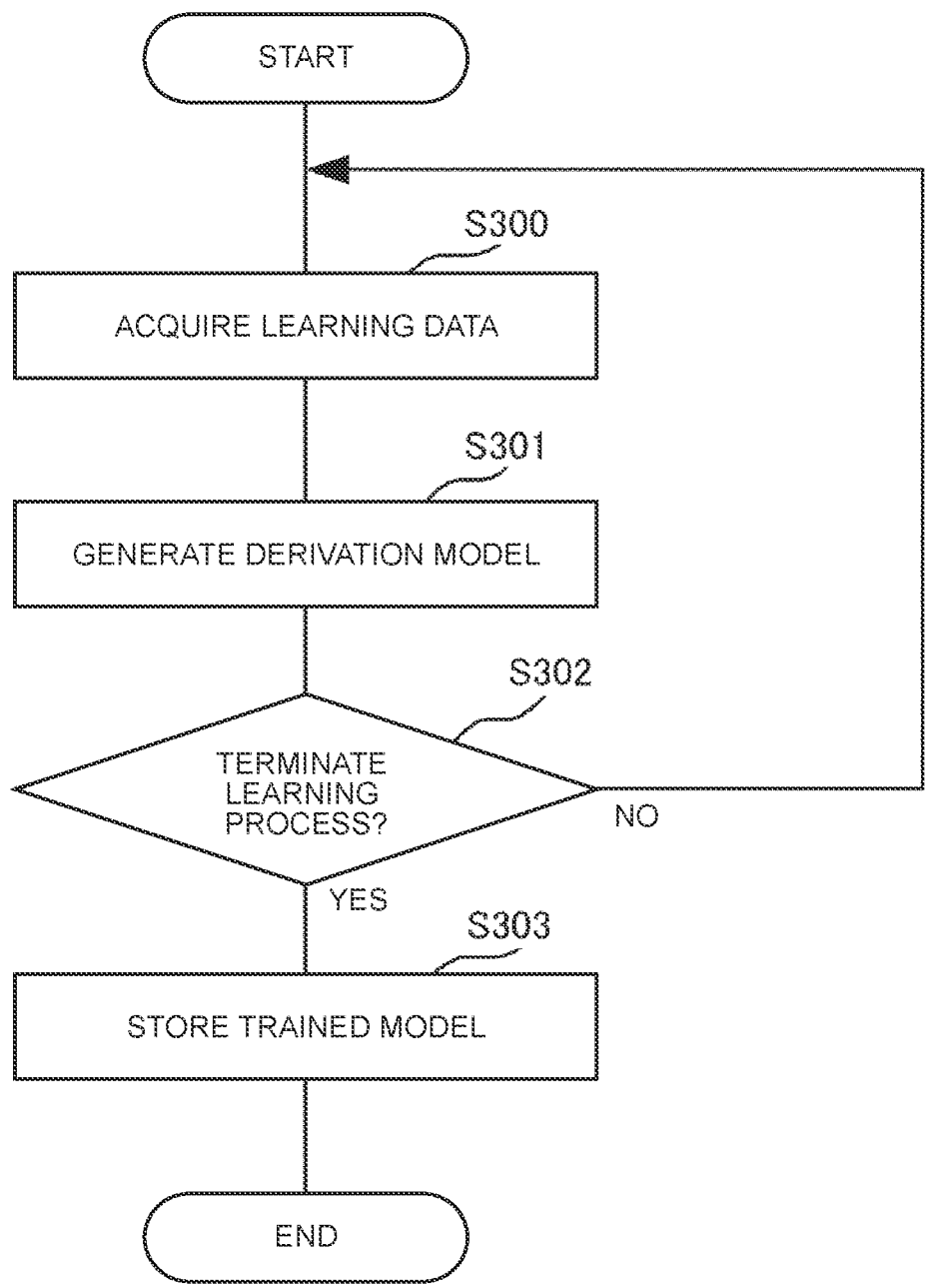
FIG. 12 is a flowchart showing a flow of a machine learning process to be executed in the center server according to the embodiment.

Next, a process to be executed by the oil diagnostic system 10 of the present embodiment to train the derivation model 160 by using the driving information acquired in advance from the on-board unit 20 will be described with reference to a flowchart of FIG. 12. The learning process shown in FIG. 12 is executed, for example, when an instruction to execute the process for generating the derivation model 160 is input.

In Step S300, the CPU 40A acquires driving information and a precursor accumulation amount as learning data.

In Step S301, the CPU 40A generates the derivation model 160 by executing machine learning by using the acquired driving information and the acquired precursor accumulation amount.

In Step S302, the CPU 40A determines whether to terminate the process for generating the derivation model 160. When determination is made to terminate the process for generating the derivation model 160 (Step S302: YES), the process proceeds to Step S303. When determination is made not to terminate the process for generating the derivation model 160 (Step S302: NO), the CPU 40A proceeds to Step S300 to acquire driving information and a precursor accumulation amount.

In Step S303, the CPU 40A stores the generated derivation model 160 in the storage 40D, and terminates the process for generating the derivation model 160.

According to the present embodiment described above, the diagnostic system compatible with the on-board unit can make a diagnosis by using the driving information acquired from the inexpensive recording device.

SUMMARY

The center server 40 serving as the oil diagnostic device of the present embodiment diagnoses oil by using the second data that is the measurement information acquired from the sensors mounted on the vehicle and provided independently of the on-board unit 20. When diagnosing the oil, the oil diagnostic device generates the statistical causal search model showing the correlation between a plurality of kinds of driving information by using the first data that is the driving information acquired in advance from the sensors mounted on the on-board unit 20, estimates driving information corresponding to the second data by using the statistical causal search model, and derives a precursor accumulation amount. That is, the oil diagnostic device diagnoses the oil based on the measurement information acquired from the measurement device 30 retrofitted to the vehicle by utilizing the driving information acquired in advance from the on-board unit 20. Thus, the diagnostic system 10 compatible with the on-board unit 20 can make a diagnosis by using the measurement information acquired from the inexpensive measurement device 30.

Remarks

In the embodiment described above, the center server 40 serves as the oil diagnostic device. However, the present disclosure is not limited to the embodiment described above. The on-board unit 20 may serve as the oil diagnostic device. In the case where the on-board unit 20 serves as the oil diagnostic device, the on-board unit 20 acquires measurement information related to the measurement device 30 mounted on the vehicle 12, and executes the oil diagnostic process by using the search model 150 and the derivation model 160 stored in advance.

In the embodiment described above, the precursor accumulation amount is derived by acquiring the measurement information and estimating the driving information. However, the present disclosure is not limited to the embodiment described above. The precursor accumulation amount may be derived by acquiring the driving information. For example, in the case where the driving information is acquired, the precursor accumulation amount may be derived by directly inputting the driving information to the deriver 430 without intervention of the estimator 420, or determination may be made as to whether to estimate driving information by the estimator 420 depending on the acquired information.

In the embodiment described above, the maximum value of the engine speed, the integrated value of the engine speed, and the average value of the fuel consumption are used as the driving information. However, the present disclosure is not limited to the embodiment described above. At least one of the maximum value of the engine speed, the integrated value of the engine speed, and the average value of the fuel consumption may be used as the driving information.

The deriver 430 according to the embodiment described above derives the precursor accumulation amount by using the maximum value of the engine speed, the integrated value of the engine speed, and the average value of the fuel consumption. However, the present disclosure is not limited to the embodiment described above. The deriver 430 may derive the precursor accumulation amount by using, for example, a vehicle speed, a traveling distance, a type of the engine oil, a type of the engine mounted on the vehicle 12, or a type of the vehicle 12.

The deriver 430 according to the embodiment described above derives the precursor accumulation amount. However, the present disclosure is not limited to the embodiment described above. For example, replacement timings of parts of the vehicle 12, such as tires and headlights, may be estimated.

The measurement device 30 according to the embodiment described above includes the sensor 30F and the GPS device 30G. However, the present disclosure is not limited to the embodiment described above. Only the sensor 30F or only the GPS device 30G may be mounted.

The measurement device 30 according to the embodiment described above measures the position of the vehicle 12B by the GPS device 30G. However, the present disclosure is not limited to the embodiment described above. For example, the position of the vehicle 12B may be measured by using the communication I/F 30E. For example, when the communication I/F 30E is Wi-Fi (registered trademark), the position and speed of the vehicle 12B can be estimated by storing a connected access point of Wi-Fi (registered trademark) and a time of connection to the access point.

Various processors other than the CPU may execute the various processes that are executed by the CPU 20A, the CPU 30A, and the CPU 40A reading the software (programs) in the embodiment described above. Examples of the processors in this case include a programmable logic device (PLD) such as a field-programmable gate array (FPGA) for which a circuit configuration can be changed after production, and a dedicated electric circuit that is a processor having a circuit configuration designed exclusively for executing a specific process, such as an application specific integrated circuit (ASIC). Each process described above may be executed by one of the various processors, or by a combination of two or more processors of the same type or different types (for example, a combination of FPGAs or a combination of a CPU and an FPGA). The hardware structure of each of the various processors is, more specifically, an electric circuit in which circuit elements such as semiconductor elements are combined.

In the embodiment described above, each program is prestored (preinstalled) in a non-transitory computer-readable recording medium. For example, the collection program 100 in the on-board unit 20 is prestored in the ROM 20B, the collection program 120 in the measurement device 30 is prestored in the storage 30D, and the oil diagnostic program 130 in the center server 40 is prestored in the storage 40D. However, the present disclosure is not limited to this case. Each program may be provided by being recorded on a non-transitory recording medium such as a compact disc read-only memory (CD-ROM), a digital versatile disc read-only memory (DVD-ROM), or a universal serial bus (USB) memory. Further, the program may be downloaded from an external device via a network.

The flows of processes in the embodiment described above are illustrative, and unnecessary steps may be omitted, new steps may be added, or the process order may be changed without departing from the gist.

What is claimed is:

1. An oil diagnostic device comprising:
   a generator configured to generate a statistical causal search model showing a correlation between a plurality of kinds of driving information by using first data that is individual kinds of driving information acquired in advance from sensors connected to an on-board unit mounted on a vehicle;
   an acquirer configured to acquire second data that is measured driving information acquired from a sensor mounted on the vehicle and provided independently of the on-board unit;
   an estimator configured to estimate estimated driving information corresponding to the second data by using the statistical causal search model; and
   a deriver configured to derive a precursor accumulation amount of the vehicle from the estimated driving information.

2. The oil diagnostic device according to claim 1, wherein the deriver is configured to derive the precursor accumulation amount by using a trained model subjected to machine learning of a relationship between the individual kinds of driving information and the precursor accumulation amount by using the first data.

3. The oil diagnostic device according to claim 1, wherein the estimated driving information includes at least one of an average value of a fuel consumption, an integrated value of an engine speed, and a maximum value of the engine speed.

4. An oil diagnostic method comprising:
   generating a statistical causal search model showing a correlation between a plurality of kinds of driving information by using first data that is individual kinds of driving information acquired in advance from sensors connected to an on-board unit mounted on a vehicle;
   acquiring second data that is measured driving information acquired from a sensor mounted on the vehicle and provided independently of the on-board unit;

estimating estimated driving information corresponding to the second data by using the statistical causal search model; and deriving a precursor accumulation amount of the vehicle from the estimated driving information.

5. A non-transitory storage medium storing an oil diagnostic program that causes a computer to execute processes comprising:

generating a statistical causal search model showing a correlation between a plurality of kinds of driving information by using first data that is individual kinds of driving information acquired in advance from sensors connected to an on-board unit mounted on a vehicle;

acquiring second data that is measured driving information acquired from a sensor mounted on the vehicle and provided independently of the on-board unit;

estimating estimated driving information corresponding to the second data by using the statistical causal search model; and deriving a precursor accumulation amount of the vehicle from the estimated driving information.

* * * * *